United States Patent
Kim et al.

(10) Patent No.: US 10,082,097 B2
(45) Date of Patent: Sep. 25, 2018

(54) METHOD FOR IMPROVING FUEL EFFICIENCY BY ANALYZING DRIVING PATTERN OF VEHICLE

(71) Applicant: Hyundai Motor Company, Seoul (KR)

(72) Inventors: Jin-Ha Kim, Gyeonggi-do (KR); Soon-Chan Pyo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 25 days.

(21) Appl. No.: 15/277,123

(22) Filed: Sep. 27, 2016

(65) Prior Publication Data

US 2017/0159596 A1 Jun. 8, 2017

(30) Foreign Application Priority Data

Dec. 7, 2015 (KR) .................. 10-2015-0173024

(51) Int. Cl.
*F02D 41/26* (2006.01)
*F02D 41/00* (2006.01)
(Continued)

(52) U.S. Cl.
CPC ....... *F02D 41/263* (2013.01); *F02D 41/0007* (2013.01); *F02D 41/1462* (2013.01);
(Continued)

(58) Field of Classification Search
CPC ............... F02D 41/263; F02D 41/3005; F02D 41/2416; F02D 41/1462; F02D 41/0007;
(Continued)

(56) References Cited

U.S. PATENT DOCUMENTS

| 7,532,987 B2* | 5/2009 | Matsubayashi ... | H01M 8/04604 429/432 |
| 2004/0250532 A1* | 12/2004 | Miura ................ | F01N 3/0842 60/277 |

(Continued)

FOREIGN PATENT DOCUMENTS

| JP | 2002-046498 A | 2/2002 |
| JP | 2004-102824 A | 4/2004 |

(Continued)

*Primary Examiner* — Joseph Dallo
(74) *Attorney, Agent, or Firm* — Mintz Levin Cohn Ferris Glovsky and Popeo, P.C.; Peter F. Corless (57) ABSTRACT

A method of improving fuel efficiency by analyzing a driving pattern of a vehicle may include: calculating weighting factors according to a driving pattern of the vehicle at coordinates, which are the ratios of weightings accumulated at the coordinates to the sum of the weightings accumulated at all coordinates in an engine operation region; calculating a reference fuel consumption ratio $K_{FUEL}$ and a reference NOx exhaust ratio $K_{NOx}$ using the weighting factors; determining whether the reference NOx exhaust ratio $K_{NOx}$ exceeds a predetermined comparative value; and controlling an engine to improve fuel efficiency when the reference NOx exhaust ratio $K_{NOx}$ is equal to or less than the predetermined comparative value.

19 Claims, 9 Drawing Sheets

(51) Int. Cl.
*F02D 41/14* (2006.01)
*F02D 41/24* (2006.01)
*F02D 41/30* (2006.01)

(52) U.S. Cl.
CPC ..... *F02D 41/2416* (2013.01); *F02D 41/3005* (2013.01); *F02D 2200/021* (2013.01); *F02D 2200/0614* (2013.01); *F02D 2200/0625* (2013.01); *F02D 2200/08* (2013.01); *F02D 2200/10* (2013.01); *F02D 2200/101* (2013.01); *F02D 2200/1002* (2013.01); *F02D 2200/606* (2013.01); *F02D 2250/31* (2013.01); *Y02T 10/144* (2013.01)

(58) Field of Classification Search
CPC ........... F02D 2200/606; F02D 2250/31; F02D 2200/101; F02D 2200/1002; F02D 2200/0625; F02D 2200/021; F02D 2200/08; Y02T 10/144
See application file for complete search history.

(56) References Cited

U.S. PATENT DOCUMENTS

| | | | |
|---|---|---|---|
| 2010/0211287 A1* | 8/2010 | Ohtsuka | F02D 41/263 701/102 |
| 2010/0287913 A1* | 11/2010 | Yamamoto | B01D 53/945 60/287 |
| 2014/0158099 A1* | 6/2014 | Asmis | F02B 29/02 123/568.15 |

FOREIGN PATENT DOCUMENTS

| | | |
|---|---|---|
| JP | 2007-270646 A | 10/2007 |
| JP | 2010-151021 A | 7/2010 |
| JP | 2010-210240 A | 9/2010 |
| JP | 2012-031798 A | 2/2012 |
| JP | 2013-221418 A | 10/2013 |
| JP | 2014-151797 A | 8/2014 |
| KR | 2009-0078239 A | 7/2009 |
| KR | 2010-0063472 A | 6/2010 |
| KR | 10-2013-0074678 A | 7/2013 |

\* cited by examiner

METHOD FOR IMPROVING FUEL EFFICIENCY BY ANALYZING DRIVING PATTERN OF VEHICLE

CROSS-REFERENCE TO RELATED APPLICATIONS

This application claims under 35 U.S.C. § 119(a) the benefit of Korean Patent Application No. 10-2015-0173024, filed on Dec. 7, 2015, the entire contents of which are incorporated by reference herein.

BACKGROUND

(a) Technical Field

The present invention relates to a method of improving fuel efficiency by analyzing a driving pattern of a vehicle, and more particularly, to a method of improving fuel efficiency by analyzing the driving pattern of the vehicle for controlling an engine to achieve optimum efficiency without an exhaust gas exceeding a restricted level.

(b) Description of the Related Art

Typically, vehicles are manufactured to have optimum fuel efficiency/exhaust gas under applicable governmental regulations. However, due to differences in the driving patterns of individual drivers, fuel efficiency of vehicles may vary. Accordingly, even if fuel efficiency/exhaust gas of vehicles is optimized, the fuel efficiency may not be optimized for a particular driver.

SUMMARY

An embodiment of the present invention is directed to a method of improving fuel efficiency by analyzing a driving pattern of a vehicle for controlling an engine to achieve optimum efficiency without an exhaust gas exceeding a restricted level.

In accordance with an embodiment of the present invention, a method of improving fuel efficiency by analyzing a driving pattern of a vehicle includes: calculating weighting factors according to a driving pattern of a vehicle at coordinates, which are the ratios of weightings accumulated at the coordinates to the sum of the weightings accumulated at all coordinates in an engine operation region; calculating a reference fuel consumption ratio $K_{FUEL}$ and a reference NOx exhaust ratio $K_{NOx}$ using the weighting factors; determining whether the reference NOx exhaust ratio $K_{NOx}$ exceeds a predetermined comparative value; and controlling an engine to improve fuel efficiency when the reference NOx exhaust ratio $K_{NOx}$ is equal to or less than the predetermined comparative value.

According to the present invention, it is possible to analyze a driving pattern of a vehicle and obtain data quantifying the operation state of an engine according to the driving pattern.

Further, it is possible to analyze a driving pattern of a driver using the data and control an engine to achieve optimal fuel efficiency without an exhaust gas exceeding a restricted range.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
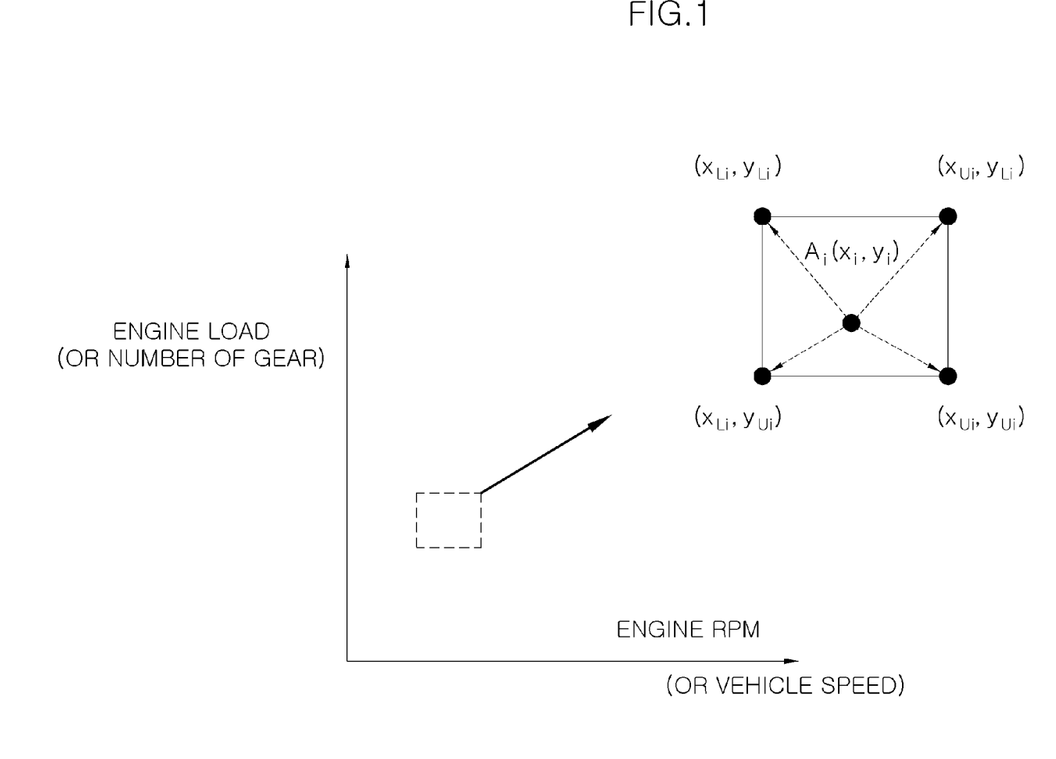
FIG. 1 is a conceptual diagram for calculating a weighting factor.
Figure 2:
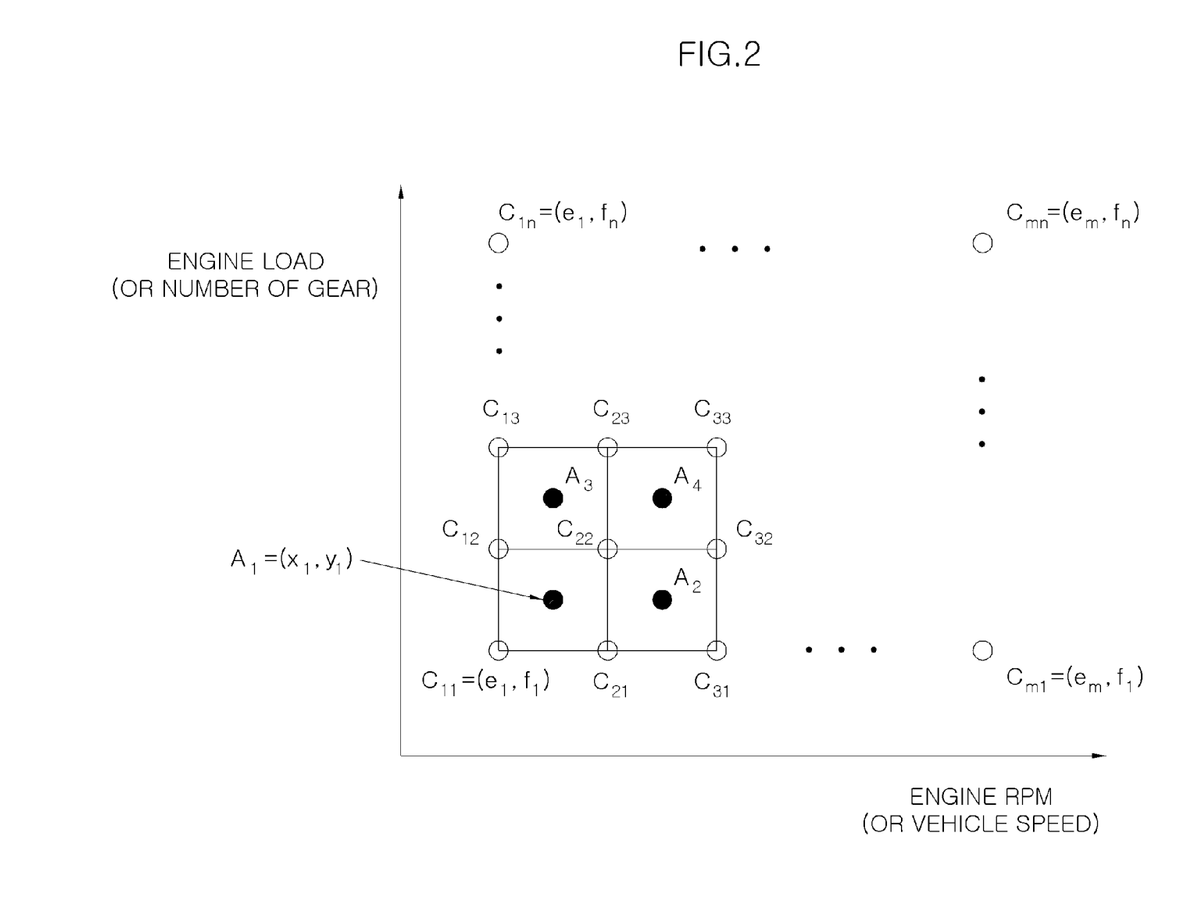
FIG. 2 is an exemplary view of a weight factor calculated in accordance with the present invention.

FIGS. 1 and 2 is a conceptual diagram for calculating a weighting factor. The concept of the weighting factor is described in detail herein. A weighting factor is calculated by extracting a virtual block, as shown in FIG. 1, for a driving pattern of a specific vehicle that is composed of an engine RPM, an engine load (fuel amount or engine torque), or a vehicle speed and the number of a gear and shows a driver's individual driving habit.

$A_i(x_i,y_i)$ is an actual driving range of a vehicle and shows a driving pattern in FIG. 1. Further, four coordinates of $(x_{Li},y_{Li})$, $(x_{Ui},y_{Li})$, $(x_{Li},y_{Ui})$, and $(x_{Ui},y_{Ui})$ are operation periods of an engine that $A_i(x_i,y_i)$ passes. $A_i(x_i,y_i)$ gives a weighting to four corner coordinates $(x_{Li},y_{Li})$, $(x_{Ui},y_{Li})$, $(x^{Li},y_{Ui})$, and $(x_{Ui},y_{Ui})$ of the operation range of the engine, in which the weighting becomes large as it goes close to $A_i(x_i,y_i)$, and it is becomes small as it goes away from $A_i(x_i,y_i)$. The method of calculating a weighting will be described in detail below (see S400).

The weighting at the corners calculated as described above are accumulated for the corner coordinates of the operation range of the engine repeatedly until the current measuring condition comes out of a predetermined measuring condition. Further, after the current measuring condition comes out of the predetermined measuring condition, the ratio of the weighting at each of coordinates to the entire weighting is calculated as the weighting factor at the coordinates under the predetermined measuring condition. The method of calculating a weighting factor will be described in detail (see S500 and S700).

When the current measuring condition does not come out of the predetermined measuring condition, a weighting at the corner coordinates is calculated for a newly measured driving pattern $A_i(x_i,y_i)$ by performing again the step (S200) of measuring the driving pattern $A_i(x_i,y_i)$, and the weightings are repeatedly accumulated.

For example, after the weighting for the initial driving pattern $A_i(x_i,y_i)$ is calculated, when the current measuring condition does not come out of the predetermined measuring condition, the weighting for the next driving pattern $A_2(x_2, y_2)$ is calculated. The initial driving pattern $A_i(x_i,y_i)$ and the next driving pattern $A_2(x_2,y_2)$ may be changed. Accordingly, the engine operation range where the initial driving pattern $A_1(x_1,y_1)$ exists (that is, a virtual block composed of four corner coordinates $(x_{L1},y_{L1})$, $(x_{U1},y_{L1})$, $(x_{Li},y_{Ui})$, and $(x_{Ui},y_{Li})$) of a pixel where the initial driving pattern $A_1(x_1,y_1)$ exists in the engine control map) may be moved to an engine operation region where the next driving pattern $A_2(x_2,y_2)$ exists (that is, a virtual block composed of four corner coordinates $(x_{L2},y_{L2})$, $(x_{U2},y_{L2})$, $(x_{L2},y_{U2})$, and $(x_{U2},y_{U2})$ of a pixel where the next driving pattern $A_2(x_2,y_2)$ exists in the engine control map). Further, when the weightings at the corners in the moved engine operation region are calculated, the weightings are repeatedly accumulated for the corner coordinates in the engine operation region.

It is possible to actively solve various problems that may be generated in the engine of a vehicle due to a driver's driving habit (driving pattern), using the weighting factors for the coordinates calculated as described above. For example, it may be possible to control an engine so that optimal fuel efficiency can be obtained within a restricted range of an exhaust gas by analyzing the individual driving pattern of a driver. Further, it may be possible to control an engine to prevent damage to a DPF (Diesel Particulate Filter) under uncontrolled burning by reducing a desired regenerative temperature in a vehicle with many idle areas or overruns. Further, smoke discharged from an engine depends on the engine RPM or the engine load. Accordingly, it may be possible to control an engine in order to prevent frequency DPF regeneration by increasing the amount of intake air for regenerating of SOOT in an area with large smokes. Further, it may be possible to control an engine in order to reduce boost pressure and a fuel amount by a predetermined level, for protecting a turbocharger in a vehicle that is usually driven under a full-load condition (full-acceleration condition). Further, it may be possible to control an engine in order to increase the amount of intake air to a predetermined level, for protecting an EGR valve in a vehicle that is usually driven in an area with a high flow rate of an EGR exhaust gas.

Figure 3:
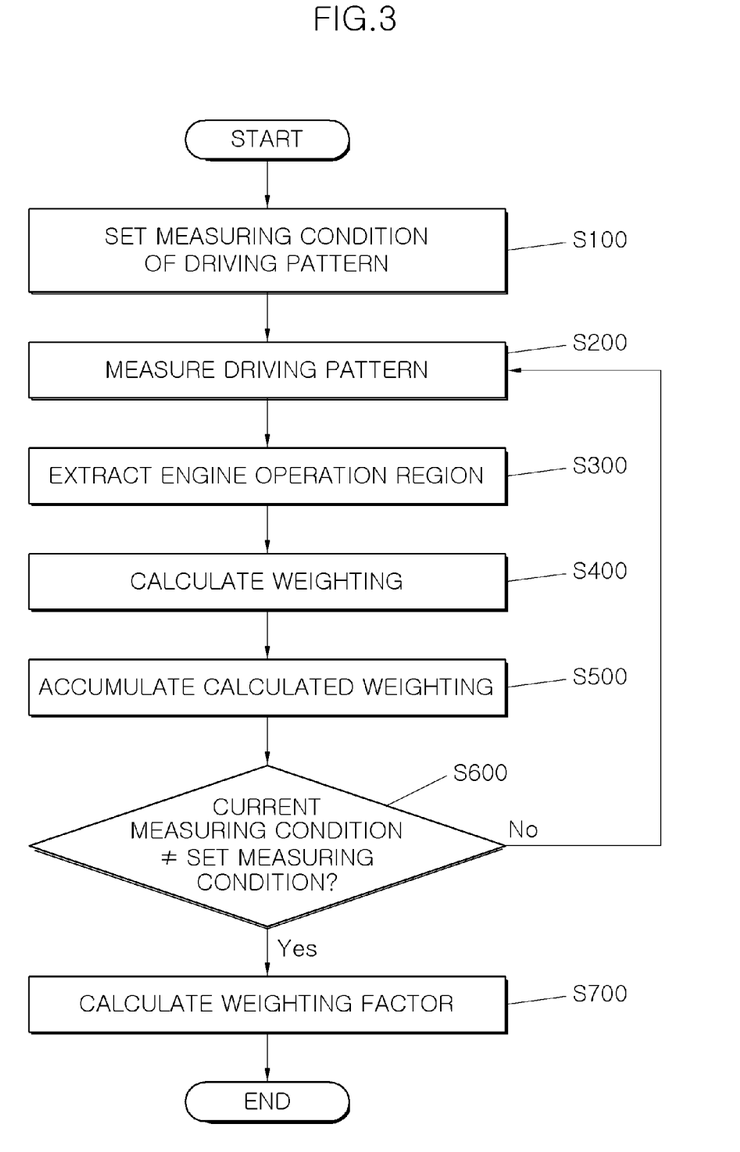
FIG. 3 is a flowchart illustrating a method of analyzing a driving pattern of a vehicle according to the present invention.

FIG. 3 is a flowchart illustrating a method of analyzing a driving pattern of a vehicle according to an embodiment of the present invention. Referring to FIG. 3, the method of analyzing a driving pattern of a vehicle according to an embodiment of the present invention includes: setting a measuring condition for a driving pattern (S100); measuring a driving pattern $A_i(x_i,y_i)$ composed of an engine RPM and an engine load (fuel amount or engine torque) or a vehicle speed and the number of a gear under the set measuring condition (S200); extracting an engine operation region for the measured driving pattern $A_i(x_i,y_i)$ from an engine control map composed of an engine RPM and an engine load (S300); calculating weightings determined in accordance with distances to corners of the engine operation region from the measured driving pattern (S400); accumulating the calculated weightings (S500); determining whether the current measuring condition comes out of the set measuring condition (S600); and calculating weighting factors under the set measuring condition that are ratios of the weightings accumulated at the coordinates to the sum of the weightings accumulated at all coordinates of the engine operation region when the current measuring condition comes out of the set measuring condition (S700).

When the current measuring condition does not come out of the set measuring condition, the method of analyzing a driving pattern of a vehicle performs again the measuring of a driving pattern $A_i(x_i,y_i)$ (S200). For example, after the weighting for the initial driving pattern $A_1(x_1,y_1)$ is calculated, when the current measuring condition does not come out of the predetermined measuring condition, the weighting for the next driving pattern $A_2(x_2,y_2)$ is calculated. The initial driving pattern $A_1(x_1,y_1)$ and the next driving pattern $A_2(x_2,y_2)$ may be changed. Accordingly, the engine operation range where the initial driving pattern $A_1(x_1,y_1)$ exists (that is, a virtual block composed of four corner coordinates $(x_{L1},y_{L1})$, $(x_{U1},y_{L1})$, $(x_{L1},y_{U1})$, and $(x_{U1},y_{U1})$ of a pixel where the initial driving pattern $A_1(x_1,y_1)$ exists in the engine control map) may be moved to an engine operation region where the next driving pattern $A_2(x_2,y_2)$ exists (that is, a virtual block composed of four corner coordinates $(x_{L2},y_{L2})$, $(x_{U2},y_{L2})$, $(x_{L2},y_{U2})$, and $(x_{U2},y_{U2})$ of a pixel where the next driving pattern $A_2(x_2,y_2)$ exists in the engine control map).

The measuring condition of a driving pattern in the setting (S100) may be a condition for continuously measuring a driving pattern until a predetermined time. For example, it may be set to 30 hours after measuring is started. Further, the measuring condition of a driving pattern in the setting (S100) may be a condition for continuously measuring a driving pattern for a predetermined time or predetermined days. For example, it may be set to the time between 9 a.m. to 10 a.m. for 30 days or to Monday for eight weeks.

The measuring condition of a driving pattern in the setting (S100) may be a condition for keeping measuring the driving pattern when the temperature of cooling water is a predetermined first temperature or more and a predetermined second temperature or less. That is, the driving pattern according to a temperature condition of cooling water may be analyzed.

In the extracting of an engine operation region (S300), the engine operation region is a virtual block composed of fourth corner coordinates $(x_{Li}, y_{Li})$, $(x_{Ui}, y_{Li})$, $(x_{Li}, y_{Ui})$, and $(x_{Ui}, y_{Ui})$ of a pixel where the measured driving pattern $A_i(x_i, y_i)$ exists in the engine control map. That is, the engine control map is not a linear table, but a virtual block composed of a set of pixels. Accordingly, the measured driving pattern $A_i(x_i, y_i)$ may exist in a pixel, in which the virtual block composed of four corner coordinates $(x_{Li}, y_{Li})$, $(x_{Ui}, y_{Li})$, $(x_{Li}, y_{Ui})$, and $(x_{Ui}, y_{Ui})$ of the pixel means the operation region of an engine. Accordingly, the influence on engine control by a change of one pixel can be expressed by percentage (%), so it is easy to estimate a change in fuel efficiency or exhaust gas due to a change in engine control variables.

The calculating of weightings (S400) calculates weightings for four corners of the engine operation region in accordance with the following Equation 1.

$$B_{LiLi} = \sqrt{\left(\frac{x_{Ui} - x_i}{x_{Ui} - x_{Li}}\right)^2 + \left(\frac{y_{Ui} - y_i}{y_{Ui} - y_{Li}}\right)^2}$$

$$B_{UiLi} = \sqrt{\left(\frac{x_{Li} - x_i}{x_{Ui} - x_{Li}}\right)^2 + \left(\frac{y_{Ui} - y_i}{y_{Ui} - y_{Li}}\right)^2}$$

$$B_{LiUi} = \sqrt{\left(\frac{x_{Ui} - x_i}{x_{Ui} - x_{Li}}\right)^2 + \left(\frac{y_{Li} - y_i}{y_{Ui} - y_{Li}}\right)^2}$$

$$B_{UiUi} = \sqrt{\left(\frac{x_{Li} - x_i}{x_{Ui} - x_{Li}}\right)^2 + \left(\frac{y_{Li} - y_i}{y_{Ui} - y_{Li}}\right)^2}$$

[Equation 1]

where $B_{LiLi}$ is the weighting at the left upper corner $(x_{Li}, y_{Li}u)$ of $A_i(x_i, y_i)$, $B_{UiLi}$ is the weighting at the right upper corner $(x_{Ui}, y_{Li})$ of $A_i(x_i, y_1)$, $B_{LiUi}$ is the weighting at the left lower corner $(x_{Li}, y_{Li})$ of $A_i(x_i, y_i)$, and $B_{UiUi}$ is the weighting at the right lower corner $(x_{Ui}, y_{Ui})$ of $A_i(x_i, y_i)$.

That is, when the driving pattern $A_i(x_i, y_i)$ measured in the actual driving region of a vehicle gets closer to the corners of the engine operation region composed of four corner coordinates $(x_{Li}, y_{Li})$, $(x_{Ui}, y_{Li})$, $(x_{Li}, u_{Ui})$, and $(x_{Ui}, y_{Ui})$, the weightings are set larger, and when it gets away from the corners, the weightings are set smaller.

The calculating of a weighting factor calculates weighting factors for coordinates under the set measuring condition in accordance with the following Equation 2.

[Equation 2]

$$\text{Weighting Factor of } C_{mn} = \frac{C_{mn}}{\sum_{m=1, n=1} C_{mn}}$$

[Equation 2]

where $C_{mn}$ is the accumulated weighting at $(e_m, f_n)$, $\sum_{m=1, n=1} C_{mn}$ is the sum of the weightings accumulated at all coordinates in the engine operation region, and Weighting Factor of $C_{mn}$ is the weighting factor at $(e_m, f_n)$. $C_{mn}$ is calculated in the accumulating (S500).

For example, as shown in FIG. 2, the driving pattern $A_i(x_i, y_i)$ can change as time passes (it is assumed in FIG. 2 that a driving pattern was measured with the current measuring condition satisfying a predetermined measuring condition from $A_1(x_1, y_1)$ to $A_4(x_4, y_4)$. Accordingly, the engine operation region composed of four corner coordinates $(x_{Li}, y_{Li})$, $(x_{Ui}, y_{Li})$, $(x_{Li}, y_{Ui})$, and $(x_{Ui}, y_{Ui})$ also changes. That is, all of $(x_{Ui}, u_{Li})$, $(x_{L2}, y_{L2})$, $(x_{U3}, y_{U3})$, and $(x_{L4}, y_{U4})$ correspond to $(e_2, f_2)$ in the engine operation region.

$C_{22}$ that is the sum of the weightings at $(e_2, f_2)$ is expressed as the following Equation 3. That is, $C_{22}$ is the resultant value in the accumulating of the calculated weightings (S500).

$$C_{22} = B_{U1L1} + B_{L2L2} + B_{U3U3} + B_{L4U4}$$ [Equation 3]

As this principle, the sum of the weightings at the coordinates shown in FIG. 2 is expressed as the following Equation 4 (see S500).

$$C_{11} = B_{L1U1}$$ [Equation 4]

$$C_{12} = B_{L1L1} + B_{L3U3}$$

$$C_{13} = B_{L3L3}$$

$$C_{21} = B_{U1U1} + B_{L2U2}$$

$$C_{22} = B_{U1L1} + B_{L2L2} + B_{U3U3} + B_{L4L4}$$

$$C_{23} = B_{U3L3} + B_{L4L4}$$

$$C_{31} = B_{U2L2}$$

$$C_{32} = B_{U2L2} + B_{U4U4}$$

$$C_{33} = B_{U4L4}$$

Accordingly, Weighting Factor of $C_{22}$ that is the weighting factor at $(e_2, f_2)$ is expressed as following Equation 5 (see S700).

$$\text{Weighting Factor of } C_{22} = \frac{C_{22}}{C_{11} + C_{12} + C_{13} + C_{21} + C_{22} + C_{23} + C_{31} + C_{32} + C_{33}}$$ [Equation 5]

That is, after the driving pattern is measured, the ratios of the accumulated weightings at the coordinates to the sum of the weightings at all the coordinates in the engine operation region are calculated as the weighting factors at the coordinates under the predetermined measuring condition. Thereafter, it is possible to actively solve various problems that may be generated in the engine of a vehicle duet to a driver's driving habit, using the weighting factors for the coordinates calculated as described above.

Figure 4:
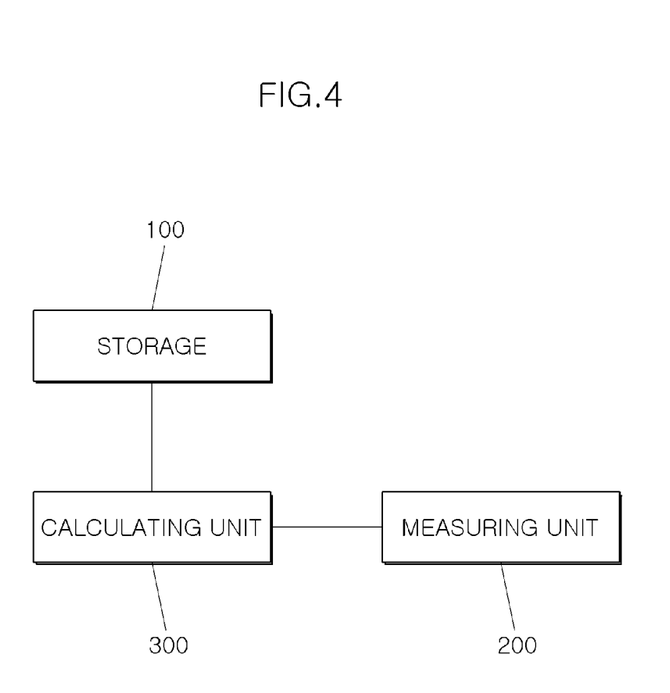
FIG. 4 is a block diagram of a system for analyzing a driving pattern of a vehicle according to the present invention.

FIG. 4 is a block diagram of a system for analyzing a driving pattern of a vehicle. Referring to FIG. 4, a system for analyzing a driving pattern of a vehicle includes a storage unit (i.e., memory) 100, a measuring unit 200, and a calculating unit 300.

The storage unit 100 may store the method of analyzing a driving pattern of a vehicle, the engine control map, the calculated weightings, and the calculated weighting factors.

The measuring unit 200 measures an engine RPM and an engine load (fuel amount or engine torque). Alternatively, it may measure a vehicle speed and the number of gear. Further, the measuring unit 200 may measure the temperature of cooling water.

The calculating unit 300 calculates weightings and weighting factors in accordance with the method of analyzing a driving pattern of a vehicle on the basis of the engine RPM, the engine load (fuel amount or engine torque), or the vehicle speed and the number of a gear measured by the measuring unit 200. For example, the calculating unit 300 may be a controller.

Figure 5:
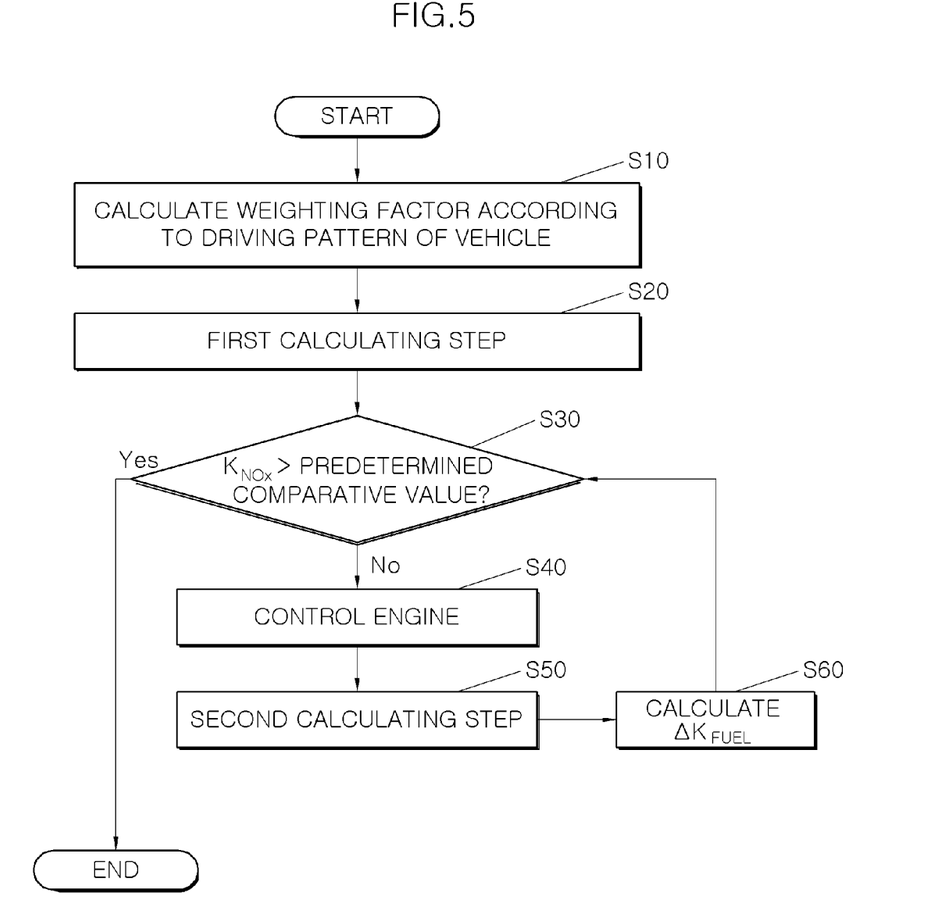
FIG. 5 is a flowchart illustrating a method of improving fuel efficiency by analyzing a driving pattern of a vehicle according to an embodiment of the present invention.
Figure 6:
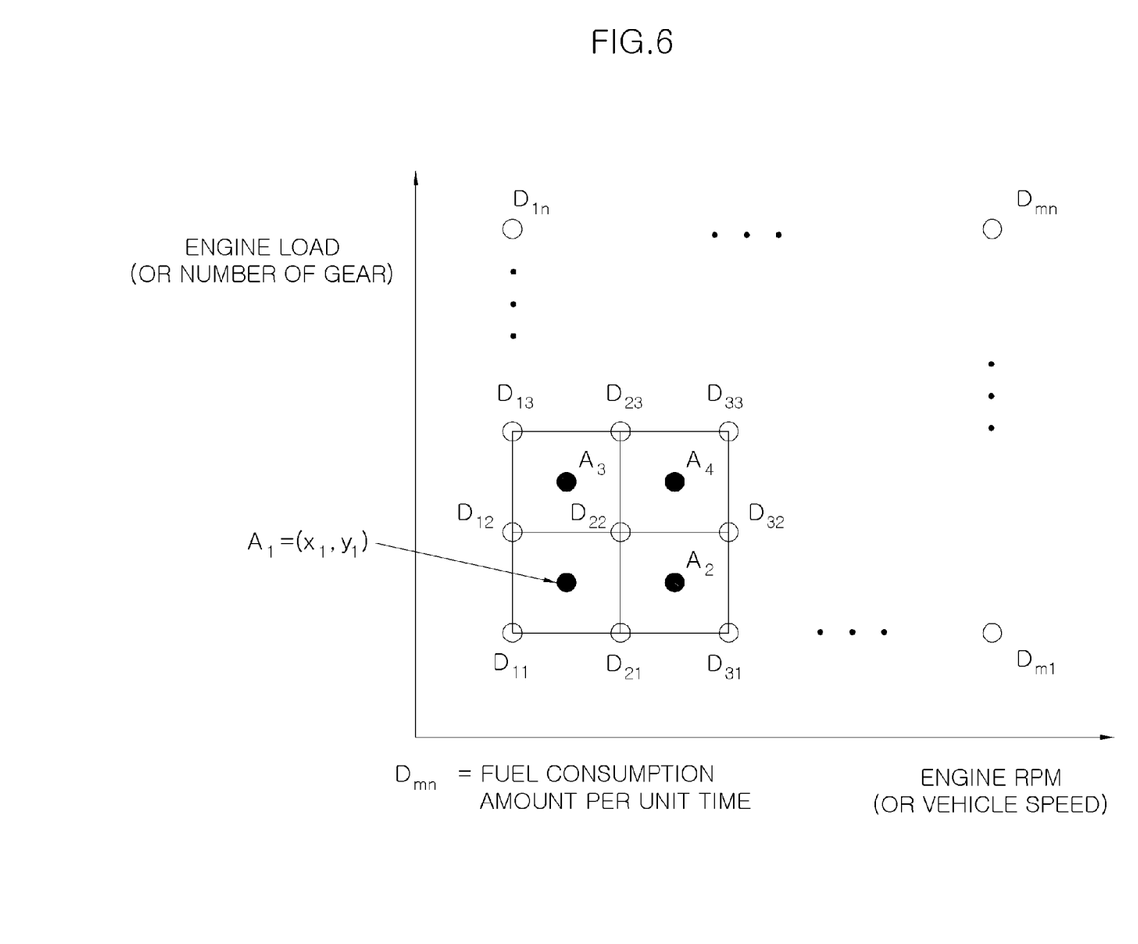
FIG. 6 is an exemplary view of a fuel consumption amount per unit time at all coordinates in a predetermined engine operation range of the present invention.
Figure 7:
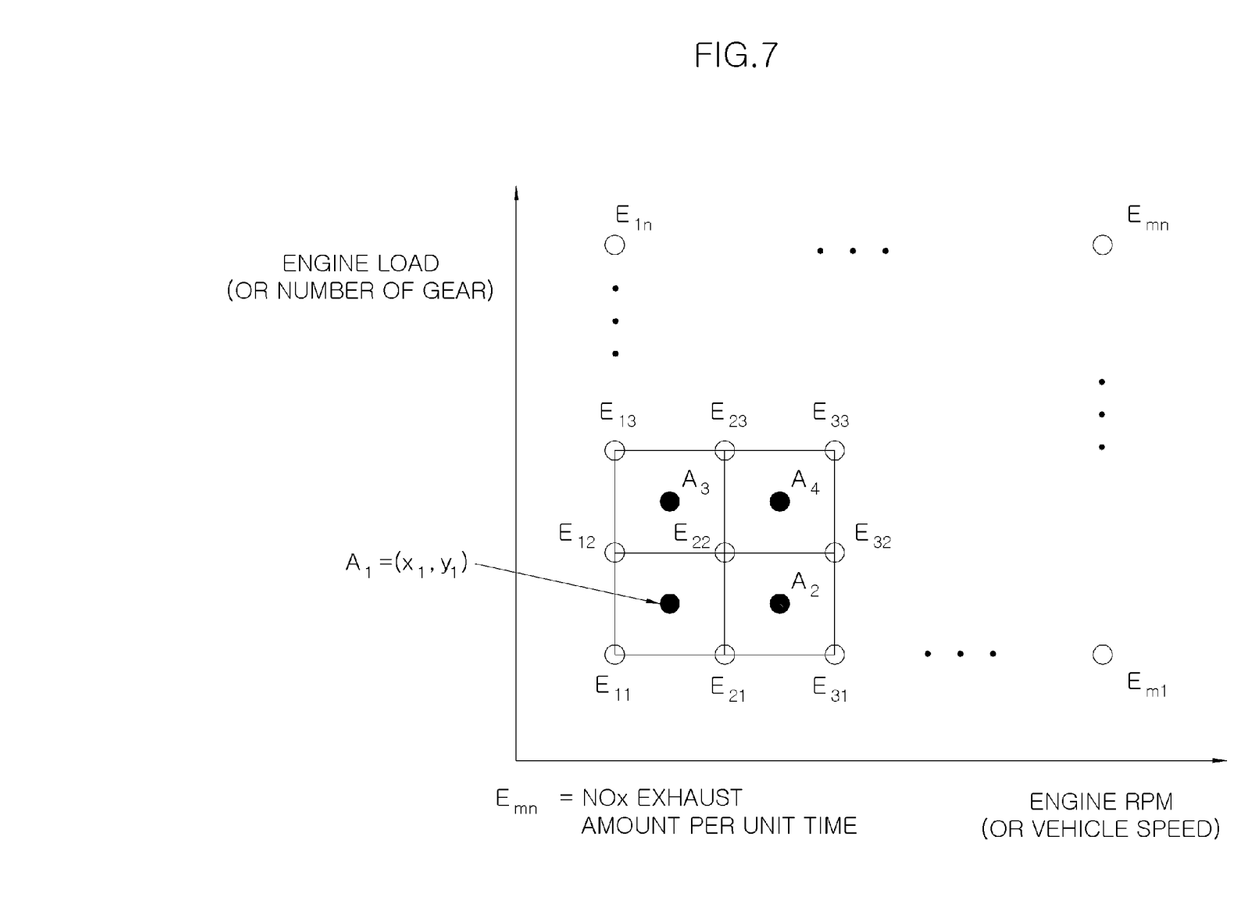
FIG. 7 is an exemplary view of an NOx exhaust amount per unit time at all coordinates in a predetermined engine operation range of the present invention.
Figure 8:
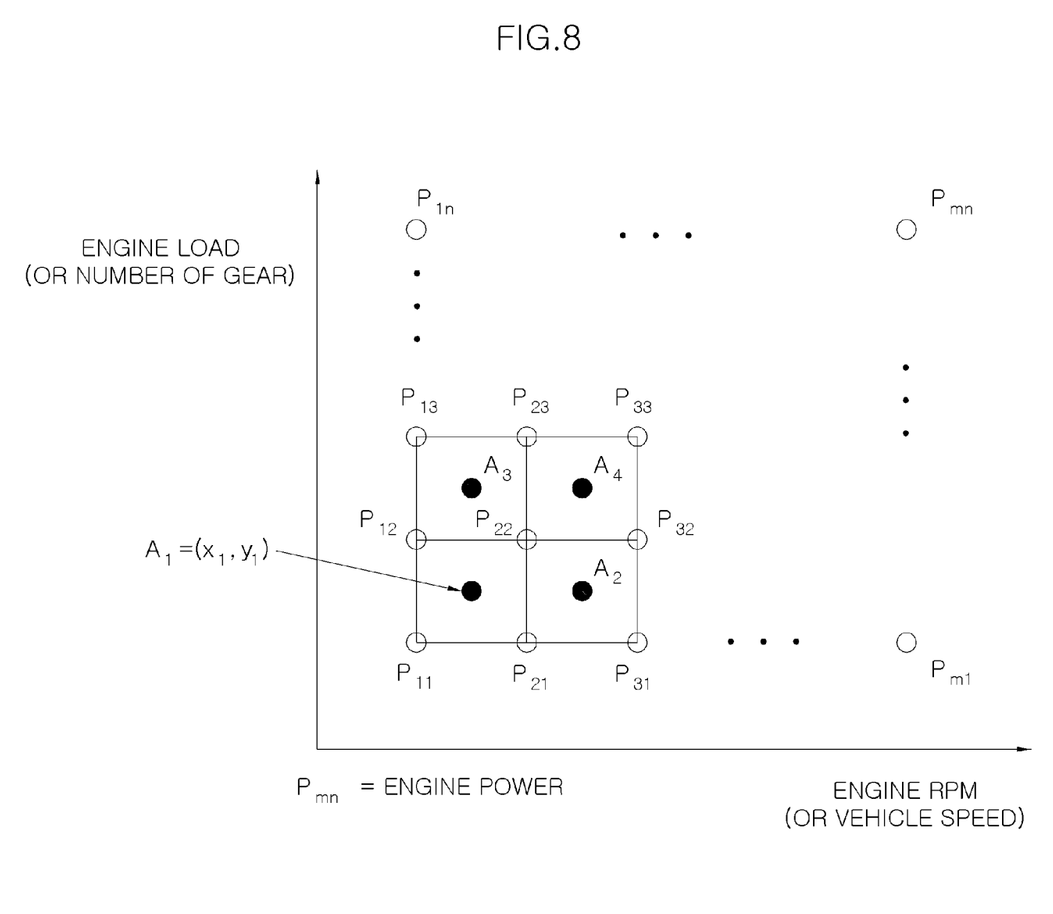
FIG. 8 is an exemplary view of engine power in a predetermined engine operation range of the present invention.
Figure 9:
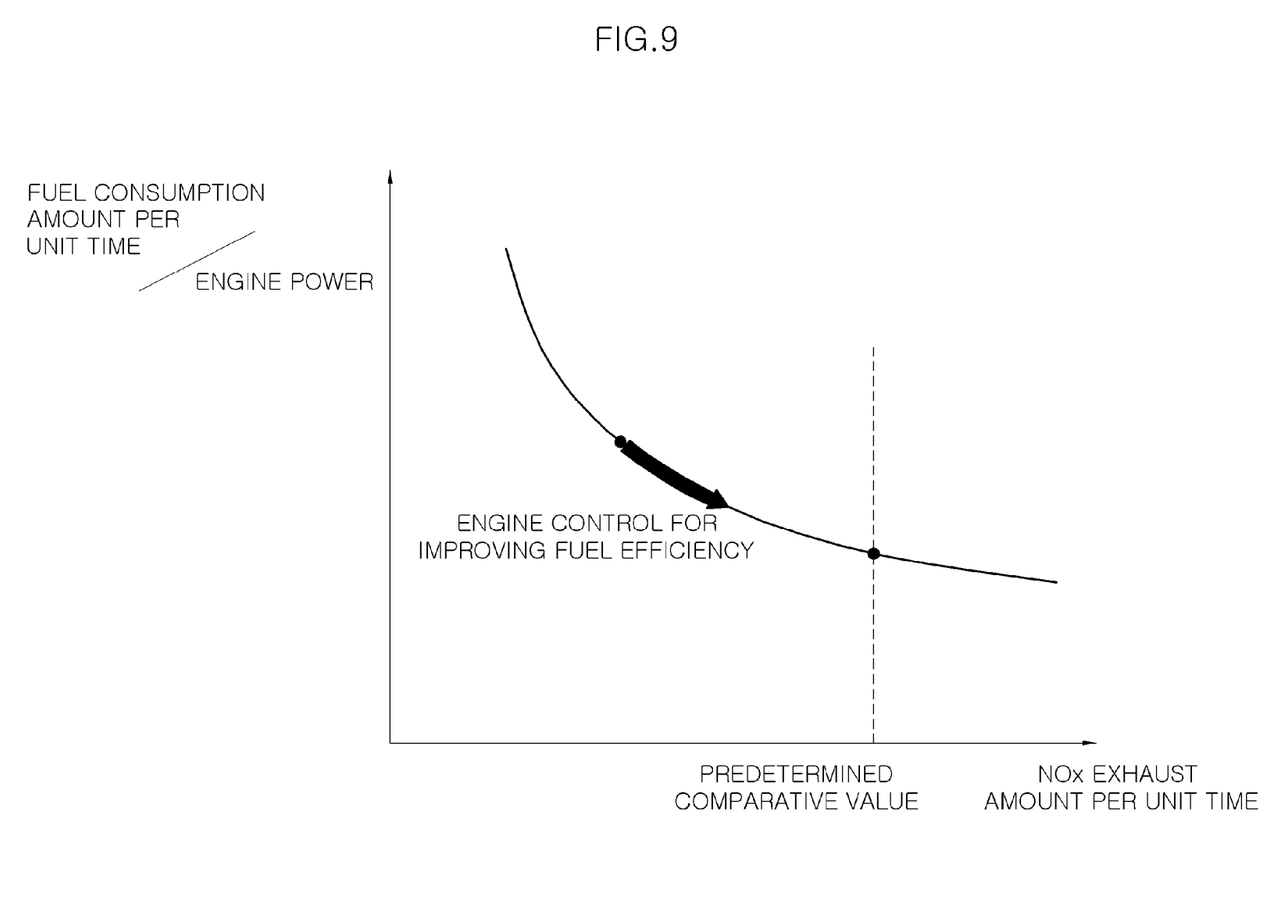
FIG. 9 is a conceptual diagram showing engine control for improving fuel efficiency in a process of controlling an engine in the present invention.

FIG. 5 is a flowchart illustrating a method of improving fuel efficiency by analyzing a driving pattern of a vehicle according to an embodiment of the present invention, and FIG. 6 is an exemplary view of a fuel consumption amount per unit time at all coordinates in a predetermined engine operation range of the present invention. FIG. 7 is an exemplary view of an NOx exhaust amount per unit time at all coordinates in a predetermined engine operation range of the present invention, FIG. 8 is an exemplary view of engine power in a predetermined engine operation range of the present invention, and FIG. 9 is a conceptual diagram showing engine control for improving fuel efficiency in a process of controlling an engine in the present invention. Referring to FIGS. 5 to 9, the method of improving fuel efficiency by analyzing a driving pattern of a vehicle according to an embodiment of the present invention includes: calculating weighting factors according to a driving pattern of a vehicle at coordinates, which are the ratios of weightings accumulated at the coordinates to the sum of the weightings accumulated at all coordinates in an engine operation region (S10); a first calculating step of calculating a reference fuel consumption ratio $K_{FUEL}$ and a reference NOx exhaust ratio $K_{NOx}$ using the weighting factors (S20); determining whether the reference NOx exhaust ratio $K_{NOx}$ exceeds a predetermined comparative value (S30): and controlling an engine to improve fuel efficiency when the reference NOx exhaust ratio $K_{NOx}$ is equal to or less than the predetermined comparative value (S40).

In the calculating of weighting factors according to a driving pattern of a vehicle (S10), the weighting factors according to a driving pattern of a vehicle are calculated by performing the steps S100 to S700. The calculated weighting factors can be expressed as in the exemplary diagram of FIG. 2.

The method of improving fuel efficiency using the method of analyzing a driving pattern of a vehicle calculates the reference fuel consumption ratio $K_{FUEL}$ by calculating the weighting factors, the fuel consumption amount per unit time $D_{mn}$, and the engine power $P_{mn}$ at all coordinates in a predetermined engine operation region in the first calculating step (S20), as in following Equation 6.

$$K_{FUEL} = \frac{\sum_{m=1,n=1} (C_{mn} \times D_{mn})}{\sum_{m=1,n=1} P_{mn}} \quad \text{[Equation 6]}$$

The fuel consumption amount per unit time $D_{mn}$ at all coordinates in the predetermined engine operation region can be expressed as in the exemplary diagram of FIG. 6 and the engine power $P_{mn}$ at all coordinates of the predetermined engine operation region may be expressed as in the exemplary diagram of FIG. 8. That is, for example, referring to FIGS. 2, 6, and 8, the reference fuel consumption ratio $K_{FUEL}$ in Equation 6 can be expressed as in following Equation 7.

$$K_{FUEL} = (C\_11 \times D\_11 + C\_12 \times D\_12 + C\_13 \times D\_13 + \quad \text{[Equation 7]}$$
$$C\_21 \times D\_21 + C\_22 \times D\_22 + C\_23 \times D\_23 +$$
$$C\_31 \times D\_31 + C\_32 \times D\_32 + C\_33 \times D\_33)/$$
$$(P\_11 + P\_12 + P\_13 + P\_21 + P\_22 +$$
$$P\_23 + P\_31 + P\_32 + P\_33)$$

Further, the method of improving fuel efficiency using the method of analyzing a driving pattern of a vehicle calculates the reference NOx exhaust ratio $K_{NOx}$ by calculating the weighting factors, the NOx exhaust amount per unit time $E_{mn}$, and the engine power $P_{mn}$ at all coordinates in a predetermined engine operation region in the first calculating step (S20), as in following Equation 8.

$$K_{NOx} = \frac{\sum_{m=1,n=1} (C_{mn} \times E_{mn})}{\sum_{m=1,n=1} P_{mn}} \quad \text{[Equation 8]}$$

The NOx exhaust amount per unit time $E_{mn}$ at all coordinates in the predetermined engine operation region can be expressed as in the exemplary diagram of FIG. 7 and the engine power $P_{mn}$ at all coordinates of the predetermined engine operation region may be expressed as in the exemplary diagram of FIG. 8. That is, for example, referring to FIGS. 2, 7, and 8, the reference NOx exhaust ratio $K_{NOx}$ in Equation 8 can be expressed as in following Equation 9.

$$K_{NOx} = (C\_11 \times E\_11 + C\_12 \times E\_12 + C\_13 \times E\_13 + \quad \text{[Equation 9]}$$
$$C\_21 \times E\_21 + C\_22 \times E\_22 + C\_23 \times E\_23 +$$
$$C\_31 \times E\_31 + C\_32 \times E\_32 + C\_33 \times E\_33)/$$
$$(P\_11 + P\_12 + P\_13 + P\_21 + P\_22 +$$
$$P\_23 + P\_31 + P\_32 + P\_33)$$

The method of improving fuel efficiency using the method of analyzing a driving pattern of a vehicle includes a second calculating step (S50) of calculating again a reference fuel consumption ratio $K_{FUEL}$ and a reference NOx exhaust ratio $K_{NOx}$, using the weighting factors, and the fuel consumption amount per unit time $d_{mn}$ at all coordinates of the engine operation region changed in the controlling of an engine (S40), the NOx exhaust amount per unit time $e_{mn}$ at all coordinates in the changed engine operation region, and the engine power $p_{mn}$ at all coordinates in the changed engine operation region.

The method of improving fuel efficiency using the method of analyzing a driving pattern of a vehicle calculates again a reference fuel consumption ratio $K_{FUEL}$ by calculating the weighting factors, the fuel consumption amount $d_{mn}$ at all coordinates in the engine operation region changed in the controlling of an engine (S40), and the engine power $p_{mn}$ at all coordinates of the engine operation region changed in the controlling of an engine (S40), as in following Equation 10, in the second calculating step (S50).

$$K_{FUEL} = \frac{\sum_{m=1,n=1} (C_{mn} \times d_{mn})}{\sum_{m=1,n=1} p_{mn}}$$ [Equation 10]

That is, for example, the reference fuel assumption ratio $K_{FUEL}$ in Equation 10 can be expressed as in following Equation 11.

$$K_{FUEL} = (C\_11 \times d\_11 + C\_12 \times d\_12 + C\_13 \times d\_13 +$$ [Equation 11]
$$C\_21 \times d\_21 + C\_22 \times d\_22 + C\_23 \times d\_23 +$$
$$C\_31 \times d\_31 + C\_32 \times d\_32 + C\_33 \times d\_33) /$$
$$(p\_11 + p\_12 + p\_13 + p\_21 + p\_22 +$$
$$p\_23 + p\_31 + p\_32 + p\_33)$$

Further, the method of improving fuel efficiency using the method of analyzing a driving pattern of a vehicle calculates again a reference NOx exhaust ratio $K_{NOx}$ by calculating the weighting factors, the NOx exhaust amount $e_{mn}$ atall coordinates in the engine operation region changed in the controlling of an engine (S40), and the engine power $p_{mn}$ at all coordinates of the engine operation region changed in the controlling of an engine (S40), as in following Equation 12, in the second calculating step (S50).

$$K_{NOx} = \frac{\sum_{m=1,n=1} (C_{mn} \times e_{mn})}{\sum_{m=1,n=1} p_{mn}}$$ [Equation 12]

That is, for example, the reference NOx exhaust ratio $K_{NOx}$ in Equation 12 can be expressed as in following Equation 13.

$$K_{NOx} = (C\_11 \times e\_11 + C\_12 \times e\_12 + C\_13 \times e\_13 +$$ [Equation 13]
$$C\_21 \times e\_21 + C\_22 \times e\_22 + C\_23 \times e\_23 +$$
$$C\_31 \times e\_31 + C\_32 \times e\_32 + C\_33 \times e\_33) /$$
$$(p\_11 + p\_12 + p\_13 + p\_21 + p\_22 +$$
$$p\_23 + p\_31 + p\_32 + p\_33)$$

The method of improving fuel efficiency using the method of analyzing a driving pattern of a vehicle includes calculating a change of the reference fuel consumption ratio $K_{FUEL}$ before and after the controlling of an engine (S40) (S60). That is, the smaller the reference fuel consumption ratio $K_{FUEL}$, the better the fuel efficiency, so if the change of the reference fuel consumption ratio $K_{FUEL}$ obtained by subtracting the reference fuel consumption ratio $K_{FUEL}$ after the controlling of an engine (S40) from the reference fuel consumption ratio $K_{FUEL}$ before the controlling of an engine (S40) is a negative value, it can be determined that the fuel efficiency has been improved by the engine control. Accordingly, it is possible to check whether the fuel efficiency is improved by the engine control, in the calculating step (S60).

The method of improving fuel efficiency using the method of analyzing a driving pattern of a vehicle performs again the determining step (S30) after the calculating of a change (S60). The controlling of an engine (S40) is repeated to improve the fuel efficiency until the reference NOx exhaust ratio $K_{NOx}$ exceeds a predetermined reference value in the determining step (S30).

The controlling of an engine (S40) is described in detail hereafter. FIG. 9 is a conceptual diagram showing engine control for improving fuel efficiency in a step of controlling an engine of the present invention, in which the relationship between the fuel consumption amount per unit time and the NOx exhaust amount per unit time to the engine power is shown. That is, when the fuel consumption amount per unit time to engine power decreases, the fuel efficiency increases, but the NOx exhaust amount per unit time also increases. Accordingly, it is possible to improve fuel efficiency by decreasing the fuel consumption amount per unit time to the engine power until the NOx exhaust amount per unit time reaches a predetermined comparative value. The predetermined comparative value may be set as an NOx exhaust ratio $K_{NOx}$ according to a restricted value of the NOx exhaust amount per unit time in the corresponding country, but is not limited thereto, and it may be set lower than the NOx exhaust ratio $K_{NOx}$ according to the restricted amount of the NOx exhaust amount in the corresponding country.

The engine control for improving fuel efficiency by reducing the fuel consumption amount per unit time to engine power includes control of increasing the engine intake amount by a predetermined reference intake amount or of decreasing engine boosting pressure by predetermined reference boosting pressure. Further, it includes control of advancing an fuel injection time into an engine by a predetermined reference time or of increasing fuel injection pressure into an engine by predetermined injection pressure. The predetermined reference intake amount, the predetermined reference boosting pressure, the predetermined reference time, and the predetermined reference injection pressure may depend on the types of vehicles.

The foregoing exemplary embodiments are only examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. A method of improving fuel efficiency by analyzing a driving pattern of a vehicle, comprising the steps of:
    calculating, by a controller, weighting factors according to the driving pattern of the vehicle at coordinates, which are the ratios of weightings accumulated at the coordinates to the sum of the weightings accumulated at all coordinates in an engine operation region;
    calculating, by the controller, a reference fuel consumption ratio $K_{FUEL}$ and a reference NOx exhaust ratio $K_{NOx}$ using the weighting factors;

determining whether the reference NOx exhaust ratio $K_{NOx}$ exceeds a predetermined comparative value; and controlling an engine to improve fuel efficiency when the reference NOx exhaust ratio $K_{NOx}$ is equal to or less than the predetermined comparative value, wherein the step of calculating the weighting factors further comprises:

setting a measuring condition for the driving pattern;

measuring the driving pattern $A_i(x_i,y_i)$ composed of an engine RPM and an engine load (fuel amount or engine torque) or a vehicle speed and the number of a gear under a set measuring condition;

extracting an engine operation region for the measured driving pattern $A_i(x_i,y_i)$ from an engine control map composed of the engine RPM and the engine load;

calculating weightings determined in accordance with distances to corners of the engine operation region from the measured driving pattern $A_i(x_i,y_i)$;

accumulating the calculated weightings for the coordinates in the engine operation region;

determining whether the current measuring condition comes out of the set measuring condition; and calculating the weighting factors for the coordinates under the set measuring condition that are ratios of the weightings accumulated at the coordinates to the sum of the weightings accumulated at all coordinates of the engine operation region when the current measuring condition comes out of the set measuring condition.

2. The method of claim 1, wherein the reference fuel consumption ratio $K_{FUEL}$ is calculated by calculating the weighting factors, and a fuel consumption amount per unit time $D_{mn}$ and engine power $P_{mn}$ at all coordinates in a predetermined engine operation region as in the following equation in the step of calculating the reference fuel consumption ratio and the reference NOx exhaust ratio:

$$K_{FUEL} = \frac{\sum_{m=1,n=1} (C_{mn} \times D_{mn})}{\sum_{m=1,n=1} P_{mn}}.$$

3. The method of claim 1, wherein the reference NOx exhaust ratio $K_{NOx}$ is calculated by calculating the weighting factors, and a NOx exhaust amount per unit time $E_{mn}$ and engine power $P_{mn}$ at all coordinates in a predetermined engine operation region as in the following equation in the step of calculating the reference fuel consumption ratio and the reference NOx exhaust ratio:

$$K_{NOx} = \frac{\sum_{m=1,n=1} (C_{mn} \times E_{mn})}{\sum_{m=1,n=1} P_{mn}}.$$

4. The method of claim 1, further comprising a step of calculating again the reference fuel consumption ratio $K_{FUEL}$ and the reference NOx exhaust ratio $K_{NOx}$, using the weighting factors, and the fuel consumption amount per unit time $d_{mn}$, the NOx exhaust amount per unit time $e_{mn}$, and the engine power $p_{mn}$ at all coordinates of the engine operation region changed in the controlling of the engine.

5. The method of claim 4, wherein a reference fuel consumption ratio $K_{FUEL}$ is calculated again by calculating the weighting factors, and the fuel consumption amount per unit time $d_{mn}$ and the engine power $p_{mn}$ at all coordinates in the engine operation region changed in the controlling of an engine, as in the following Equation, in the step of calculating again the reference fuel consumption ratio and the reference NOx exhaust ratio:

$$K_{FUEL} = \frac{\sum_{m=1,n=1} (C_{mn} \times d_{mn})}{\sum_{m=1,n=1} p_{mn}}.$$

6. The method of claim 4, wherein the reference NOx exhaust ratio $K_{NOx}$ is calculated again by calculating the weighting factors, and the NOx exhaust amount per unit time $e_{mn}$ and the engine power $p_{mn}$ at all coordinates in the engine operation region changed in the controlling of an engine, as in the following Equation, in the step of calculating again the reference fuel consumption ratio and the reference NOx exhaust ratio:

$$K_{NOx} = \frac{\sum_{m=1,n=1} (C_{mn} \times e_{mn})}{\sum_{m=1,n=1} p_{mn}}.$$

7. The method of claim 4, further comprising a step of calculating a change of the reference fuel consumption ratio $K_{FUEL}$ before and after the controlling of the engine.

8. The method of claim 7, wherein the determining step is performed again after the calculating of a change.

9. The method of claim 1, wherein the controlling of an engine is to increase an engine intake amount by a predetermined reference intake amount.

10. The method of claim 1, wherein the controlling of the engine is to decrease engine boosting pressure by a predetermined reference boosting pressure.

11. The method of claim 1, wherein the controlling of the engine is to advance an fuel injection time into the engine by a predetermined reference time.

12. The method of claim 1, wherein the controlling of the engine is to increase fuel injection pressure into the engine by a predetermined injection pressure.

13. The method of claim 1, wherein in the extracting of an engine operation region, the engine operation region is a virtual block composed of four corner coordinates $(x_{Li},y_{Li})$, $(x_{Ui},y_{Li})$, $(x_{Li},y_{Ui})$ and $(x_{Ui},y_{Ui})$, and of a pixel where the measured driving pattern $A_i(x_i,y_i)$ exists in the engine control map.

14. The method of claim 1, wherein when the current measuring condition does not come out of the set measuring condition, the measuring of the driving pattern $A_i(x_i,y_i)$ is performed again.

15. The method of claim 1, wherein the measuring condition of a driving pattern in the setting is a condition for continuously measuring the driving pattern until a predetermined time.

16. The method of claim 1, wherein the measuring condition of the driving pattern in the setting is a condition for continuously measuring a driving pattern for a predetermined time or predetermined days.

17. The method of claim 1, wherein the measuring condition of the driving pattern in the setting is a condition for keeping measuring the driving pattern when the temperature of cooling water is a predetermined first temperature or more and a predetermined second temperature or less.

18. The method of claim 1, wherein the calculating of weightings calculates to weightings for four corners of the engine operation region in accordance with the following Equation:

$$B_{LiLi} = \sqrt{\left(\frac{x_{Ui} - x_i}{x_{Ui} - x_{Li}}\right)^2 + \left(\frac{y_{Ui} - y_i}{y_{Ui} - y_{Li}}\right)^2}$$

$$B_{UiLi} = \sqrt{\left(\frac{x_{Li} - x_i}{x_{Ui} - x_{Li}}\right)^2 + \left(\frac{y_{Ui} - y_i}{y_{Ui} - y_{Li}}\right)^2}$$

$$B_{LiUi} = \sqrt{\left(\frac{x_{Ui} - x_i}{x_{Ui} - x_{Li}}\right)^2 + \left(\frac{y_{Li} - y_i}{y_{Ui} - y_{Li}}\right)^2}$$

$$B_{UiUi} = \sqrt{\left(\frac{x_{Li} - x_i}{x_{Ui} - x_{Li}}\right)^2 + \left(\frac{y_{Li} - y_i}{y_{Ui} - y_{Li}}\right)^2}$$

(where $B_{LiLi}$ is the weighting at the left lower corner $(x_{Li}, y_{Li})$ of $A_i(x_i, y_i)$, $B_{UiLi}$ is the weighting at the right lower corner $(x_{Ui}, y_{Li})$ of $A_i(x_i, y_i)$, $B_{LiUi}$ is the weighting at the left lower corner $(x_{Li}, y_{Ui})$ of $A_i(x_i, y_i)$, and $B_{UiUi}$ is the weighting at the right lower corner $(x_{Ui}, y_{Ui})$ of $A_i(x_i, y_i)$).

19. The method of claim 1, wherein the calculating of the weighting factor calculates weighting factors for coordinates under the set measuring condition in accordance with the following Equation:

$$\text{Weighting Factor of } C_{mn} = \frac{C_{mn}}{\sum_{m=1, n=1} C_{mn}}$$

(where $C_{mn}$ is the weighting accumulated at $(e_m, f_n)$, $\sum_{m=1, n=1} C_{mn}$ is the sum of the weightings accumulated at all coordinates in the engine operation region, and Weighting Factor of $C_{mn}$ is the weighting factor at $(e_m, f_n)$).

* * * * *